Dec. 30, 1969     T. L. HENSON     3,486,694
OVEN CONTROL SYSTEMS

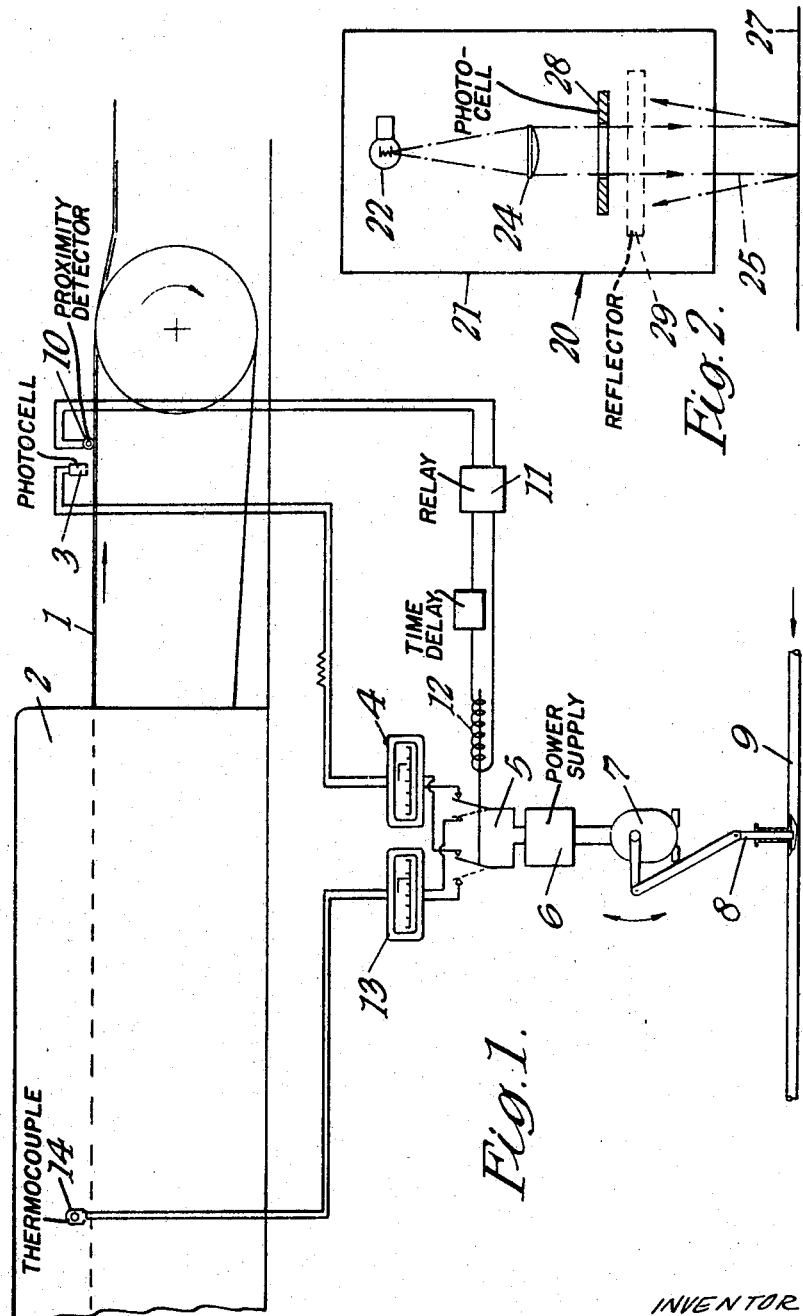

Filed Dec. 21, 1967     4 Sheets-Sheet 3

INVENTOR
THOMAS LESLIE HENSON

Learman, Learman & McCulloch
ATTORNEYS

Dec. 30, 1969

T. L. HENSON 3,486,694

OVEN CONTROL SYSTEMS

Filed Dec. 21, 1967

INVENTOR
THOMAS LESLIE HENSON
BY *his attorneys,*
*Learman, Learman & McCulloch*

3,486,694
OVEN CONTROL SYSTEMS
Thomas Leslie Henson, Westwood Works, England, assignor to Baker Perkins Inc., Saginaw, Mich., a corporation of New York
Continuation-in-part of application Ser. No. 633,615, Apr. 25, 1967, which is a continuation-in-part of application Ser. No. 434,195, Feb. 23, 1965. This application Dec. 21, 1967, Ser. No. 692,438
Claims priority, application Great Britain, Mar. 2, 1964, 8,666/64
Int. Cl. F23n 5/20; G05d 23/30
U.S. Cl. 236—15                                26 Claims

ABSTRACT OF THE DISCLOSURE

An oven control system, which includes means for sensing the moisture content and/or colour of a product leaving the oven and for controlling the oven so that the product has a desired moisture content and/or colour, means being provided for detecting the absence of a product leaving the oven and thereupon exerting an independent control over the oven.

---

This application is a continuation-in-part of my pending application Ser. No. 633,615, filed Apr. 25, 1967, now abandoned, for "Oven Control Systems," which is accorded the priority date of Great Britain patent application 8,666 filed Mar. 2, 1964, and a continuation-in-part of my co-pending application, Ser. No. 434,195, filed Feb. 23, 1965, now abandoned for "Oven Control Systems," which is accorded the priority date of Great Britain patent application No. 7,196 filed Feb. 18, 1966.

This invention relates to oven control systems, for the purpose of continuously controlling the treatment of a product passing through an oven, such as a baker's oven, in order to obtain desired characteristics of the treated product.

The present invention consists in a control system for an oven, which includes sensing means for sensing the moisture content and/or colour of a product emerging from the oven, the moisture content and/or colour of the product being dependent upon the heat treatment effected by the oven, means for controlling the heat treatment carried out by the oven in accordance with the moisture content and/or colour sensed by the sensing means in order to achieve a desired moisture content and/or colour of the product, and means for detecting the absence of a product emerging from the oven in order to exert an independent control over the heat treatment in the absence of a product.

The expression "colour" as used in the specification is intended to include the tone or shade of a particular colour, so that where, for example, a product changes from light brown to dark brown under the influence of the heat treatment, the system will function to maintain the product emerging from the area at the correct desired tone or shade of brown. Conversely, it is not necessary that the system should be able to sense a change to a completely different colour which would never be encountered during the operation of the system. With the aid of filters the system may be rendered especially sensitive to slight changes from the desired colour.

In the accompanying drawings:

FIGURE 1 shows diagrammatically one form of system according to the present invention;

FIGURE 2 shows in more detail the color sensing means used in FIGURE 1;

Figure 3:
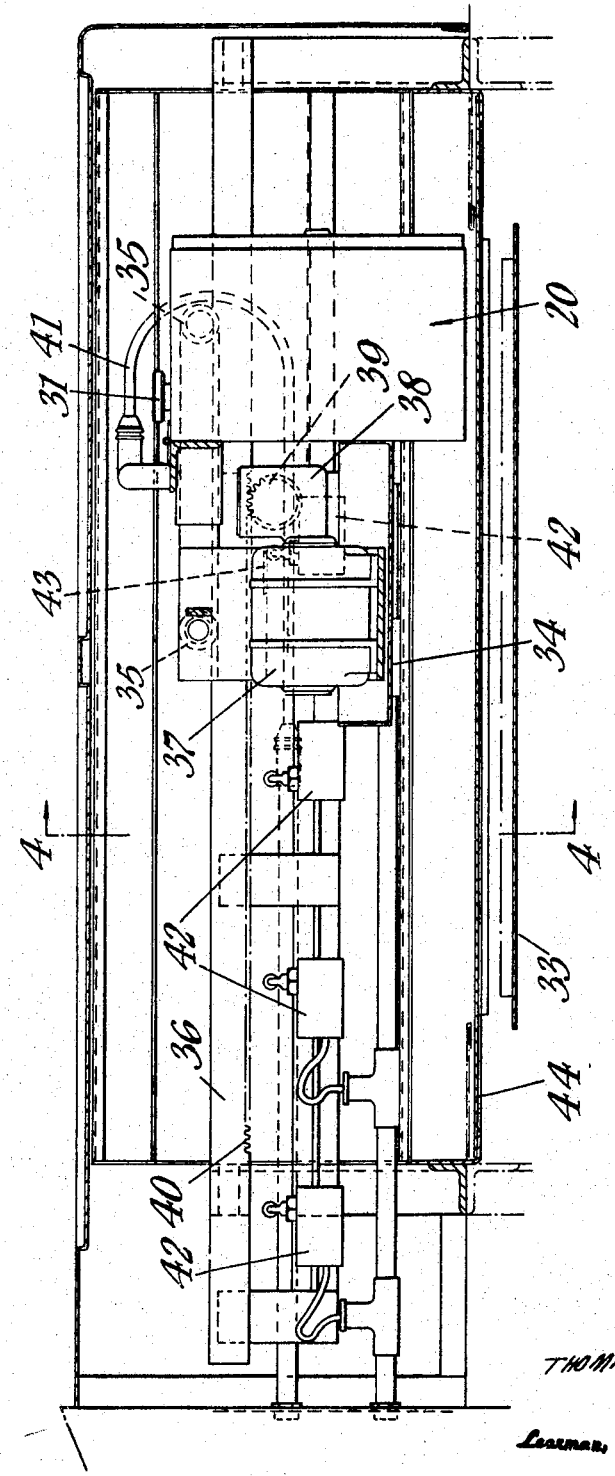
FIGURE 3 is a side elevation of a mounting for the colour sensing means of FIGURE 2.

In carrying the invention into effect according to one convenient mode wherein colour is sensed by way of example, the invention will be described with reference to an oven for baking Swiss roll sponge wherein a continuous strip or carpet of Swiss roll batter is conveyed continuously through the oven, each portion of the strip or carpet of batter progressively changing in state as it progresses through the oven until a certain final colour of the Swiss roll sponge is obtained on completion of the process as each portion leaves the oven.

A control system is provided for the oven in which colour sensing means are arranged to sense the final colour of the product and to cause for example a change of temperature, position of dampers, speed of conveyor in the oven or like adjustment, in order to ensure that as the strip or carpet leaves the oven it is the correct desired colour.

As shown in FIGURE 1, the colour of the sponge 1 emerging from a gas-fired oven 2 is sensed by a photoelectric cell 3 which is positioned adjacent the discharge end of the oven and which is adapted to scan across the width of the conveyor band. The photoelectric cell 3 is arranged to produce an output voltage which is dependent upon the colour of the baked Swiss roll sponge emerging from the oven. This output voltage is fed to an indicator and control device 4 and thence through a switch 5 to a power supply 6 which controls a servomotor 7 which, in turn, controls a valve 8 governing the supply of gas through a header pipe 9 to the burners of the oven 2.

In this way, the colour of the Swiss roll sponge emerging from the gas fired oven is maintained approximately constant, any slight changes from the desired colour being rapidly and automatically corrected by an appropriate change in the supply of gas to the burners, although equally effective correction may be obtained by a change in the speed of the conveyor band, in the position of dampers or a like adjustment.

Suitable means are provided in the circuit of the control device 4 for adjusting the condition at which the system is stable, and this adjusted condition of the colour is maintained by the system. An alarm circuit is provided so that if the system detects a considerable departure from the desired colour, due for example to a fault, the alarm will be raised to call for attention by an operator.

In order to deal with a gap which may occur between the trailing edge of one length of Swiss roll sponge and the leading edge of the next, or to deal with the situation when no Swiss roll sponge is passing through the oven, detecting means in the form of a capacitative proximity detector 10 are arranged adjacent the colour sensing means 3 to detect the absence of Swiss roll sponge at this point.

When such an absence is detected, the change of capacitance at the detector 10 is arranged to actuate a relay 11 which in turn energizes a winding 12 controlling the changeover switch 5 which disconnects the servomotor 7 from the colour control and connects it to a temperature indicator control device 13 which is connected to a thermocouple 14 associated with the interior of the oven 2 so that the fuel supply to the oven, and thus its temperature, are temporarily controlled to a desired temperature determined by the temperature control circuit. As soon as the detecting means 10 detects further Swiss roll sponge, the changeover switch 5 is actuated again and the control of the fuel supply is once again governed by the colour sensing means.

In order to prevent the detecting means 10 from "hunting" a time delay device is provided so that in the event of short gaps appearing on the oven band, the changeover switch 5 is not actuated. Thus in the case of the production of bread, biscuits, and the like, which products are normally spaced apart on the conveyor band, the changeover switch 5 will not be operated until there is a definite "break" in the production.

FIGURE 2 shows in more detail the color sensing means 20 which includes a housing 21 containing a low-voltage electrical lamp 22, and an optical system, including lens 24 for focusing a beam 25 of light upon a product shown diagrammatically as at 27.

Light is reflected and scattered back from the product 27 onto an annular photocell 28. Since the intensity of the reflected light depends upon the colour of the product, the electrical output from the photocell 28 will give an indication of the colour of the product 27.

For the purpose of calibration, a white tile 29 is mounted so that it can be temporarily moved to the position shown in dash lines in FIGURE 2 to reflect light directly back onto the photocell 28 which thus gives a standard reference output for adjustment purposes.

Figure 4:
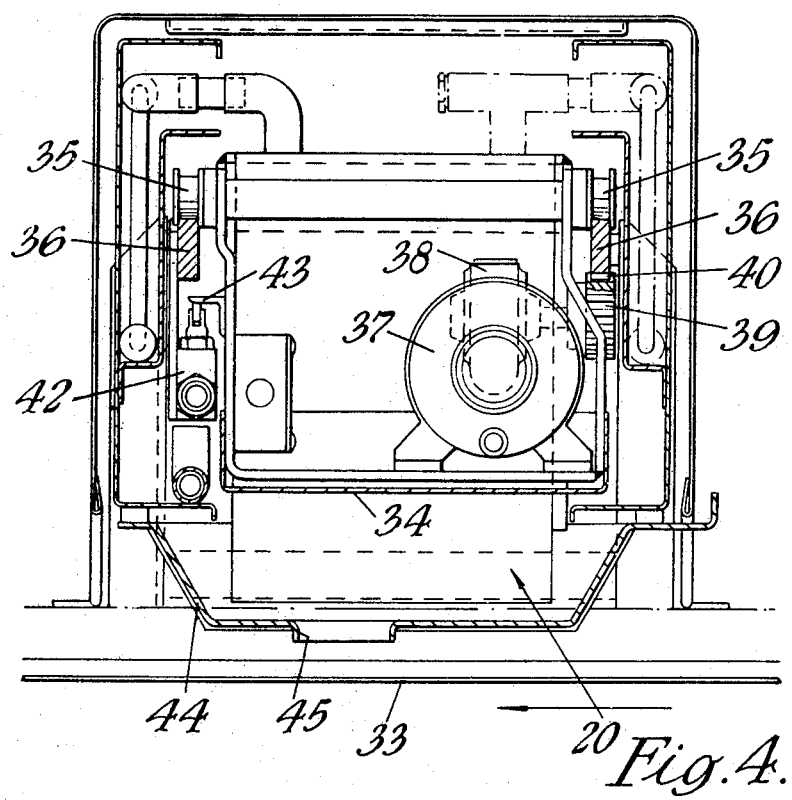
FIGURE 4 is a cross section taken on line 4—4 of FIGURE 3.

FIGURES 3 and 4 show a mounting for causing the colour sensing means 20 to be reciprocated transversely to scan the entire width of the band 33 carrying the products from the oven.

The sensing means 20 is secured to a casing 34 supported by rollers 35 between fixed parallel rails 36. The sensing means 20 and the casing 34 can be driven from one end of the rails 36 to the other (i.e., transversely of the band 33) by means of an electrical motor 37 located in the casing 34 and which drives, through a speed reduction gear 38, a pinion 39 meshing with a rack 40 formed on the underneath edge of one of the rails 36.

The supply cables to the motor 37 and to the lamp 22 of the sensing means 20 pass through flexible conduit 41, and the supply to the motor is reversed, to cause reciprocation of the sensing means 20 and casing 34, at adjustable points determined by selected ones of the limit switches 42 which cooperate with a trip arm 43 on the casing 34.

The whole apparatus is protected from heat radiated from the band 33 and the products carried on it by a heat shield 44 having a transverse slot 45 through which the sensing means 20 may scan the product on the band 33.

Figure 5:
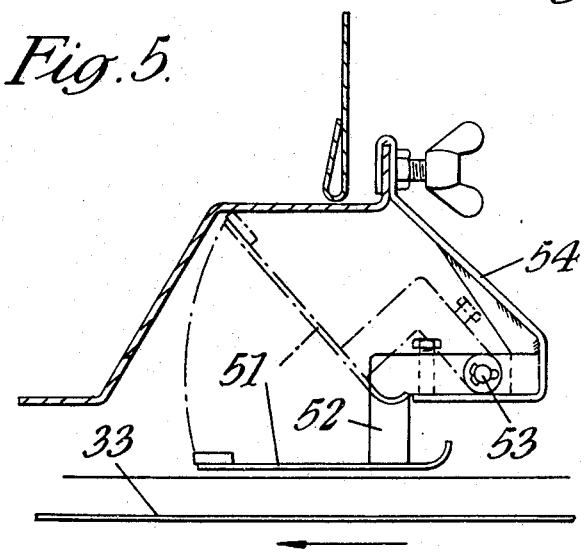
FIGURE 5 shows means for detecting the presence or absence of a product for use in the system of FIGURE 1.

In FIGURE 5 there is shown the proximity detector 10. Under normal working conditions a plate 51 is disposed parallel to and spaced from the band 33 and forms with the band 33 and associated circuitry a proximity detector to indicate whether or not a product is present on the band 33 beneath the plate 51.

However, the plate 51 secured to arms 52 is mounted for movement about a pivot 53 on a horizontal axis carried on a fixed bracket 54 so that should the plate be engaged by a lump in the product, the plate 51 will swing upwardly to the position shown in phantom and avoid damage.

Various alternative detecting means can be used to signal a changeover from standard thermocouple temperature control to automatic control of colour, as for example by inductance, radiation, sonic beams and the like. The detecting means can also be incorporated with the colour sensing means such that upon a signal received by the colour sensing head being outside the desired colour range, the changeover switch is actuated.

Indicators may be associated with the control circuits to indicate the operating and desired (preset) values of colour and oven temperature.

In the case of employing turbulent ovens, i.e. forced convection heat, the colour sensing means may also control the weight of air being recirculated in the oven chamber.

Figure 6:
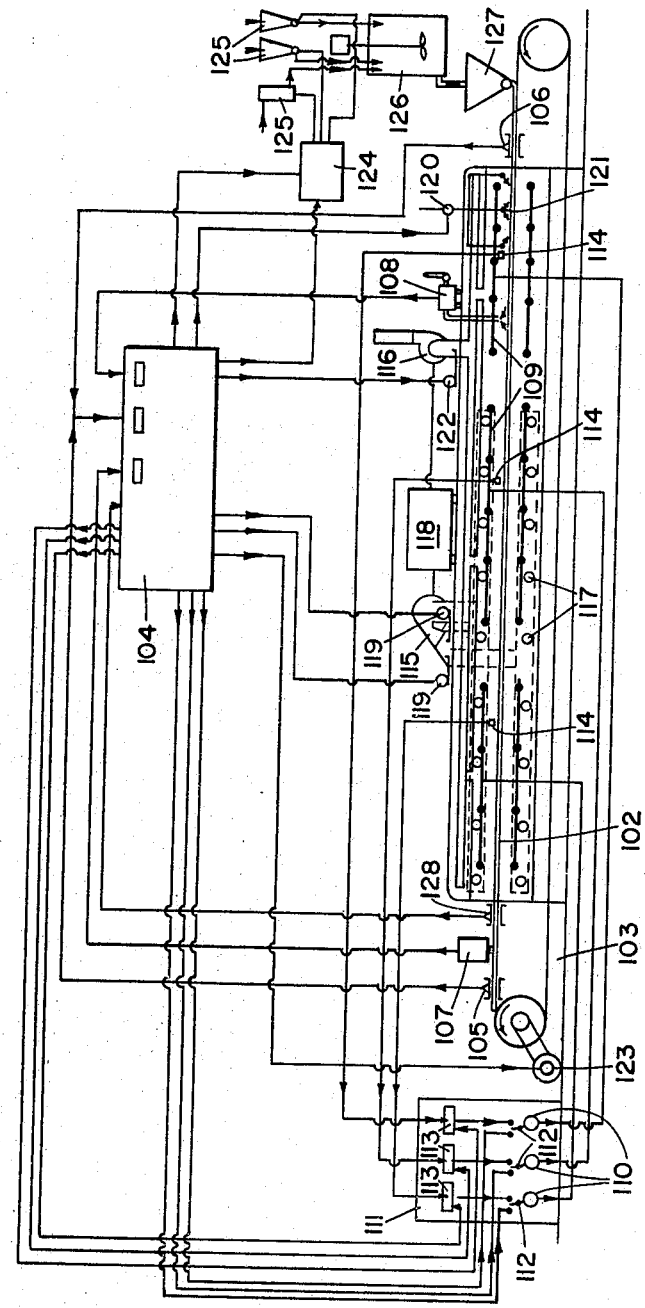
FIGURE 6 is a diagrammatic view of an oven and a control system therefor.

In carrying the invention into effect according to another convenient mode by way of example wherein both moisture content and colour are sensed, the accompanying drawing, FIGURE 6, shows diagrammatically an oven 101 for baking Swiss roll sponge wherein a continuous strip or carpet 102 of Swiss roll batter is conveyed on an endless belt 103 continuously through the oven, each portion of the strip or carpet 102 of batter progressively changing in state as it progresses through the oven until a certain final moisture content and colour of the Swiss roll sponge is achieved on completion of the process as each portion leaves the oven.

A control system is provided for the oven which includes a computer 104 arranged to receive signals from sensing means arranged to sense the final state or condition of the product and in turn signals if necessary for a change in the various operating conditions of the oven in order to ensure that as the strip or carpet leaves the oven it is the correct desired moisture content and colour, which are two major requirements in the baked product.

The sensing means 105 for sensing the moisture content of the Swiss roll sponge at the discharge end of the oven, consists of an electrode working as a variable capacitance in accordance with the moisture content of the adjacent sponge. A similar moisture content sensing device 106 is positioned at the entrance to the oven. The colour of the sponge is sensed by a photoelectric cell 107 which is positioned adjacent the moisture content sensing means 105 and which is adapted to scan across the width of the conveyor band. The photoelectric cell 107 is arranged to produce an output voltage which is dependent upon the colour of the baked Swiss rolls emerging from the oven and which is fed to the computor 104. The humidity inside the oven is measured by a humidity indicator 108 which sends an output signal to the computor 104. In the indicator 108 a continuous sample is taken of the oven atmosphere, heated to a predetermined temperature, passed through one orifice, cooled so that all the moisture condenses, passed through a second orifice at supersonic speed, and then pumped into the atmosphere.

The oven 101 is provided with gas burners 109 controlled by control valves 110 located in a gas input control panel 111 which also includes change over switches 112 arranged so that the valves 110 are controlled either directly by the computor 104 or by temperature controllers 113 connected to temperature sensitive elements 114 located in the oven, and to the computor 104. The changeover from one control to the other will be explained more fully hereinafter.

The oven is also provided with a turbulence fan 115, an extraction fan 116, turbulence ports 117, and a main control panel 118 for starting up the oven before the computer takes over control.

The computer 104 is arranged to control motorized turbulence (forced convection) control dampers 119, a steam injection control valve 120 controlling steam injectors 121 for increasing the humidity in the oven and a motorized extraction damper 122 for decreasing the humidity in the oven. The computor 104 is also arranged to control a device 123 for regulating the speed of the oven conveyor band 103 and a panel 124 comtrolling the ingredients of the mix for the sponge.

The sponge mix is prepared by feeding its ingredients through meters 125 controlled by panel 124 to a mixer 126 and thence to a sponge depositer 127 located adjacent the entrance to the oven.

The colour and moisture of the sponge can be influenced by the following factors:
(a) The humidity within the baking chamber of the oven,
(b) The temperature within the baking chamber,
(c) The amount of turbulence or forced convection in the oven, (d) The time each portion of the sponge spends in the oven, i.e. the oven-conveyor speed, and (e) The ingredients and nature of mixing.

The computor 104 is arranged to control the above factors in the following way:

(i) The humidity may be increased by controlled steam injection, or decreased by controlled extraction, (ii) The temperature within the baking chamber may be controlled by the burner control valves 110, (iii) The amount of turbulence may be controlled by the dampers 119.

(iv) The time in the oven may be controlled by the speed regulating device 123, and (v) The ingredients and nature of mixing may be controlled by the metering devices 125, and the type and time of mixing employed (e.g. ingredients heated, or cooled under pressure, or in vacuum and so forth).

Any of the above corrections to the operating conditions may take place simultaneously with others under the control of the computor 104.

In this way, the moisture content and colour of the Swiss roll emerging from the gas fired oven is maintained approximately constant, any slight changes from the desired moisture content and colour being rapidly and automatically corrected by an appropriate change in the supply of gas to the burners, speed of conveyor band, position of dampers or like adjustment.

Suitable means are provided in the moisture content and colour control circuits for adjusting the conditions at which the system is stable, and this adjusted condition of the moisture content and colour is maintained by the system.

In order to deal with a gap which may occur between the trailing edge of one length of Swiss roll sponge and the leading edge of the next, or to deal with the situation when no Swiss roll sponge is passing through the oven, detecting means 128 in the form of a photoelectric cell and lamp for example, or a capacitative proximity detector, are arranged adjacent the colour sensing means 107 to detect the absence of Swiss roll sponge at this point.

When such an absence is detected, a signal is fed to the computor 104 which in turn actuates the changeover switches 112 which disconnect the gas control valves 110 from the direct control of the computor in accordance with the moisture content and colour and connects the valves 110 to the temperature controller 113, the fuel supply to the gas burner, and thus the oven temperature is temporarily controlled to a desired temperature determined by the temperature control circuit which, in turn, is controlled by the computor to suitable preset temperatures. As soon as the detecting means detects further Swiss roll sponge, the changeover switches are actuated again and the control of the fuel supply is once again governed by the computor in accordance with moisture content and colour sensing means.

It is to be noted that to prevent the detecting means from "hunting" a time delay is provided such that in the event of short gaps appearing on the oven band, the changeover switches are not operated, but will be operated for longish breaks in the baking of Swiss roll sponge. However, when considering the production of bread, biscuits, sponges and the like, which products are normally spaced apart on the conveyor band, the frequency of the signal to the detecting means can be used to determine whether or not the changeover switch is actuated.

Various detecting means can be used to signal a changeover from standard thermocouple temperature control to automatic control of temperature, moisture content and colour, as for example by capacitance, inductance, radiation, sonic beams and the like. The detecting means can also be incorporated with the moisture content sensing means such that upon a signal received by the moisture content sensing head being outside the desired moisture content range, the changeover switch is actuated.

Indicators may be associated with the control circuits to indicate the operating and desired (preset) values of moisture content, colour and oven temperature.

In the case of employing turbulent ovens, i.e. forced convection heat, the moisture content and colour sensing means may also control the weight of air being recirculated in the oven chamber.

The sensing means arranged to measure the moisture content of the strip or carpet of batter before it enters the oven feeds this information to the computor so that in the event of a change in the moisture content of the batter entering the oven the computor can signal for a suitable adjustment to compensate for it.

Various modifications may be made within the scope of the present invention.

I claim:

1. A control system for an oven having an oven chamber, which includes means for moving a product such as bread dough in a path of travel through the oven chamber, means for sensing the condition of a product emerging from the oven chamber, means mounting said sensing means in spaced relation with said product for to-and-fro movement transversely across the said path of travel, and means for controlling the heat treatment effected by the oven chamber in accordance with the condition sensed by the sensing means in order to achieve a desired condition of the product.

2. A system as claimed in claim 1, wherein means are provided for detecting the absence of a product emerging from the oven chamber.

3. A system as claimed in claim 1, wherein the controlling means includes means for controlling the temperature of the oven chamber in accordance with the colour sensed by the sensing means.

4. A system as claimed in claim 1, wherein the condition sensing means includes a photoelectric cell arranged to receive light from the product emerging from the oven chamber.

5. A system as claimed in claim 4, wherein the colour sensing means also includes a lamp and an optical system for directing light from the lamp onto the product emerging from the oven.

6. A system as claimed in claim 4, wherein the condition sensing means also includes a member having a standard reference colour which can be temporarily positioned to reflect light upon the photoelectric cell for calibration purposes.

7. A system as claimed in claim 1, wherein the condition sensing means is carried upon a carriage mounted upon rails, the carriage being reciprocated from one end of the rails to the other by means of an electrical motor.

8. A system as claimed in claim 1, wherein the absence of a product emerging from the oven chamber is detected by a proximity detector arranged adjacent the exit of the oven chamber.

9. A system as claimed in claim 1, wherein detecting means is arranged to actuate a change-over switch, in the event of the absence of a product, and thereby disconnect the condition controlling means and connect means for sensing the temperature of the oven chamber to exert a control upon the oven temperature.

10. In association with an oven having means for conveying a product through the oven and means for regulating the temperature of the oven, a control system which includes means for sensing the condition of the product emerging from the oven, means operatively connecting said sensing means to said regulating means whereby the condition of the emerging product is maintained at a predetermined level, means for measuring the temperature of the oven, means for detecting the absence of a product emerging from the oven, and means for disconnecting said sensing means from said regulating means and connecting said temperature measuring means to said regulating means in the event of the detection of the absence of a product by said detecting means.

11. A control system for an oven, which includes means for sensing the colour of a product emerging from the oven, the colour of the product being dependent upon the heat treatment of the oven, means for controlling the heat treatment effected by the oven in accordance with the colour sensed by the sensing means in order to achieve a desired colour of the product, and means for exerting an independent control over the oven temperature in the absence of a product emerging from the oven, the colour sensing means including a photoelectric cell arranged to receive light from the product emerging from the oven, and the photoelectric cell being of annular form and surrounding a beam of light from the lamp to the product.

12. A control system for an oven which includes means for sensing the condition of a product emerging from the oven, the condition of the product being dependent upon the heat treatment of the oven, means for controlling the heat treatment effected by the oven in accordance with the condition sensed by the sensing means in order to achieve a desired condition of the product, means for exerting an independent control over the oven temperature in the absence of a product emerging from the oven, detecting means arranged to actuate a changeover switch, in the event of the absence of a product, and thereby disconnect the condition controlling means and connect means for sensing the temperature of the oven to exert a control upon the oven temperature, and a time delay device arranged to delay operation of the changeover switch so that small gaps in the product are ignored.

13. A control system for an oven, which includes: means for moving a product such as bread dough in a path of travel through the oven; means for sensing the condition of a product emerging from the oven; means mounting said moving means for to-and-fro movement transversely across the said path of travel; means for controlling the heat treatment effected by the oven in accordance with the condition sensed by the sensing means in order to achieve a desired condition of the product; and means for detecting the absence of a product emerging from the oven.

14. A system as claimed in claim 13 wherein the capacitor is mounted for pivotal movement about a horizontal axis so that it can move upwardly in a direction away from the product in the event of a larger portion of product being encountered.

15. A control system for an oven having an oven chamber, which includes means for sensing the condition of a product emerging from the oven chamber, the condition of the product being dependent upon the heat treatment of the oven chamber, means for controlling the heat treatment effected by the oven chamber in accordance with the condition sensed by the sensing means in order to achieve a desired condition of the product, and means responsive to a temperature affected condition of the oven chamber atmosphere for exerting an independent control over the oven chamber temperature in the absence of a product emerging from the oven chamber, the absence of a product emerging from the oven chamber being detected by a proximity detector arranged adjacent the exit of the oven chamber, the proximity detector including a capacitor plate located immediately above the product emerging from the oven chamber.

16. A system as claimed in claim 19, wherein means are also provided for sensing the colour of a product emerging from the oven, the colour of the product being dependent upon the heat treatment effected by the oven, and means for controlling the heat treatment carried out by the oven also in accordance with the colour sensed by the colour sensing means in order to achieve a desired colour of the product.

17. A system as claimed in claim 16, wherein further sensing means are provided for sensing the moisture content of a product entering the oven, and means for controlling the heat treatment carried out by the oven also in accordance with the moisture content sensed by he further moisture sensing means.

18. An oven for the treatment of discrete products comprising conveyor means for conveying the product through the oven: treatment means regulating the condition of the oven and affecting the product within the oven, the condition of the treated product depending upon the treatment exerted by said treatment means; a control system which includes means for sensing the condition of the product emerging from the oven, means for controlling the treatment exerted by said treatment means upon the product in accordance with the condition sensed by the sensing means in order to achieve a desired condition of the product, and means for detecting the absence of a product and exerting an independent control over said treatment means in the absence of the product.

19. A control system as set forth in claim 18 wherein the means for sensing the condition of the product includes means for sensing the moisture content of the product.

20. A system as claimed in claim 19, wherein the means for controlling the heat treatment carried out by the oven includes means for controlling the humidity within the oven.

21. A system as claimed in claim 19, wherein the means for controlling the heat treatment carried out by the oven includes means for controlling heating means associated with the oven.

22. A system as claimed in claim 19, wherein the means for controlling the heat treatment carried out by the oven includes means for controlling the amount of turbulence or forced convection.

23. A system as claimed in claim 19, wherein the means for controlling the heat treatment carried out by the oven includes means for controlling the time taken for a product to pass through the oven.

24. A system as claimed in claim 19, wherein means are provided for controlling the preparation of a product fed to the oven for heat treatment by the oven in accordance with the nature of the product arriving at and/or leaving the oven.

25. In association with an oven for the heat treatment of products having means for conveying a product through an oven chamber, the condition of the treated product depending upon the treatment exerted by the oven, an oven chamber, a control system which includes means for sensing the condition of the product emerging from the oven chamber, means for controlling the heat treatment exerted by the oven chamber upon the product in accordance with the condition sensed by the sensing means in order to achieve a desired condition of the product, means for detecting the absence of a product emerging from the oven chamber and exerting an independent control over the oven chamber temperature in response to a temperature affected condition of the oven chamber atmosphere and in the absence of the product; and time delay means for delaying operation of said latter means so that small gaps in the flow of product are ignored.

26. A control system for an oven, which includes means for sensing the condition of a product emerging from the oven, the condition of the product being dependent upon the heat treatment of the oven, means for controlling the heat treatment effected by the oven in accordance with the condition sensed by the sensing means in order to achieve a desired condition of the product, means for exerting an independent control over the oven temperature in the absence of a product emerging from the oven, detecting means arranged to actuate a change-over switch, in the event of the absence of a product, and thereby disconnect the condition controlling means and connect means for sensing the temperature of the oven to exert a control upon the oven temperature, and a time delay device arranged to delay operation of the change-over switch so that small gaps in the product are ignored.

References Cited

UNITED STATES PATENTS

| | | | |
|---|---|---|---|
| 3,203,678 | 8/1965 | Sawyer et al. | 236—15 X |
| 2,008,793 | 7/1935 | Nichols | 73—355 X |
| 2,518,905 | 8/1950 | Kniveton | 263—3 |
| 2,540,966 | 2/1951 | Swain | 236—15 |
| 3,101,618 | 8/1963 | Hance | 73—355 X |
| 1,774,433 | 8/1930 | Gardiner | 99—331 |
| 1,980,816 | 11/1934 | McDill | 340—258 X |
| 2,025,542 | 12/1935 | Lugar | 236—15 |
| 2,674,809 | 4/1954 | Meienhofer | 34—48 |
| 2,724,903 | 11/1955 | Ehrisman | 73—73 X |
| 3,124,430 | 3/1964 | Eicken | 73—73 X |
| 3,332,279 | 7/1967 | Tompos et al. | 73—73 |

WILLIAM E. WAYNER, Primary Examiner

U.S. Cl. X.R.

73—169, 356; 99—331; 107—55; 236—46, 78; 340—258